(12) United States Patent
Liu et al.

(10) Patent No.: US 10,439,978 B2
(45) Date of Patent: *Oct. 8, 2019

(54) SYSTEM, METHOD, AND APPARATUS FOR REPLYING TO COMMENTS

(71) Applicant: ALIBABA GROUP HOLDING LIMITED, George Town, Grand Cayman (KY)

(72) Inventors: Shuyan Liu, Hangzhou (CN); Tian Zhang, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/154,653

(22) Filed: Oct. 8, 2018

(65) Prior Publication Data

US 2019/0044910 A1 Feb. 7, 2019

Related U.S. Application Data

(63) Continuation of application No. 15/070,945, filed on Mar. 15, 2016, now Pat. No. 10,097,501.

(30) Foreign Application Priority Data

May 15, 2015 (CN) .......................... 2015 1 0250735

(51) Int. Cl.
*G06F 15/16* (2006.01)
*H04L 12/58* (2006.01)

(52) U.S. Cl.
CPC .............. *H04L 51/32* (2013.01); *H04L 51/02* (2013.01)

(58) Field of Classification Search
CPC ................................. H04L 51/32; H04L 51/02
See application file for complete search history.

(56) References Cited

U.S. PATENT DOCUMENTS

| 5,198,642 | A | 3/1993 | Deniger | |
|---|---|---|---|---|
| 6,684,027 | B1 | 1/2004 | Rosenberg | |
| 7,032,182 | B2 | 4/2006 | Prabhu et al. | |
| 8,364,467 | B1 * | 1/2013 | Bowman | G06F 16/35 |
| | | | | 704/9 |
| 8,417,706 | B2 * | 4/2013 | Berger | G06Q 10/107 |
| | | | | 707/740 |
| 9,311,619 | B2 * | 4/2016 | Mosley | G06Q 10/10 |
| 9,450,769 | B2 * | 9/2016 | Wolff | G06Q 10/107 |
| 2002/0120489 | A1 | 8/2002 | Matsuda et al. | |

(Continued)

FOREIGN PATENT DOCUMENTS

WO WO 2016/186714 A1 11/2016

OTHER PUBLICATIONS

PCT International Search Report and Written Opinion dated Jun. 16, 2016, issued in corresponding International Application No. PCT/US16/22459 (7 pages).

*Primary Examiner* — Jonathan A Bui (74) *Attorney, Agent, or Firm* — Finnegan, Henderson, Farabow, Garrett & Dunner, LLP (57) ABSTRACT

A method for replying to comments is disclosed. The method may comprise obtaining, by a terminal device, a request to reply to a plurality of comments on a published post; determining, by the terminal device, a first target group from the plurality of comments, the first target group including reply targets having similar contents; and sending, by the terminal device, a reply to each of the reply targets.

20 Claims, 7 Drawing Sheets

(56) References Cited

U.S. PATENT DOCUMENTS

| | | |
|---|---|---|
| 2002/0161611 A1 | 10/2002 | Price et al. |
| 2005/0287982 A1 | 12/2005 | Brewer et al. |
| 2007/0250479 A1 | 10/2007 | Lunt et al. |
| 2008/0147810 A1 | 6/2008 | Kumar et al. |
| 2008/0222531 A1 | 9/2008 | Davidson et al. |
| 2008/0307320 A1* | 12/2008 | Payne .................. G06F 3/0481 715/751 |
| 2011/0314102 A1* | 12/2011 | Teramoto ............. G06Q 10/107 709/205 |
| 2013/0027428 A1 | 1/2013 | Graham et al. |
| 2014/0214973 A1 | 7/2014 | DeLuca et al. |
| 2015/0089399 A1 | 3/2015 | Megill et al. |
| 2016/0154889 A1* | 6/2016 | Allen .................. G06F 16/9535 707/728 |

* cited by examiner

A: you lost weight
B: you just lost weight, LOL.
C: ur on diet?
D: what weight loss pills did you take? LIPO?
E: you lost weight + ( Reply E: )

SEND

- ● A: you lost weight
- ● B: you just lost weight, LOL.
- ● C: ur on diet?
- ○ D: what weight loss pills did you take? LIPO?
- ● E: you lost weight OK ( Reply E: )

SEND

SYSTEM, METHOD, AND APPARATUS FOR REPLYING TO COMMENTS

CROSS REFERENCE TO RELATED APPLICATION

The present application is a continuation of U.S. application Ser. No. 15/070,945 filed Mar. 15, 2016, which is based on and claims the benefits of priority to Chinese Application No. 201510250735.4, filed May 15, 2015, both of which are incorporated herein by reference in their entireties.

TECHNICAL FIELD

The present application relates to methods, apparatus, and systems for replying to comments.

BACKGROUND

With recent developments in Internet technology and terminal devices, social networks have become an increasingly important part of people's lives. They can affect our ways of acquiring information, thinking, and life. In a virtual space, users can manage their circle of friends and use social networks as an avenue for acquiring information, self-showcasing, and marketing.

For example, social network users can upload and publish posts, including photos, publish their status, or share articles. They may receive comments on their posts and reply to those comments, forming an interactive online environment.

In some situations, a user, such as a celebrity, may receive many comments from other users on the user's post. The number of comments on one post can be thousands or more. Present technologies only allow the user to reply to the comments either one by one or all at once. Replying to all comments one by one may cost the user a considerable amount of time, sometimes involving repeatedly typing similar replies. If the user chooses not to reply, on the other hand, it may imply impoliteness and may affect the user's public image. Thus, it is important to develop a better reply method for such applications.

SUMMARY

One aspect of the present disclosure is directed to a method for replying to comments. The method may comprise obtaining, by a terminal device, a request to reply to a plurality of comments on a published post; determining, by the terminal device, a first target group from the plurality of comments, the first target group including reply targets having similar contents; and sending, by the terminal device, a reply to each of the reply targets.

Another aspect of the present disclosure is directed to a method for replying to comments. The method may be implemented by a receiver terminal device. The method may comprise obtaining a reply to reply targets, a first target group including the reply targets, and the first target group being comments sharing a similar content, and displaying the reply.

Another aspect of the present disclosure is directed to an apparatus for replying to comments. The apparatus may comprise a request obtaining unit configured to obtain a request to reply to a plurality of comments on a published post, a similarity determination unit configured to determine a first target group from the plurality of comments, the first target group including reply targets having similar contents, and a reply sending unit configured to send a reply to each of the reply targets.

Another aspect of the present disclosure is directed to an apparatus for replying to comments. The apparatus may comprise a request sending unit configured to send to a server a request to reply to a plurality of comments on a published post and to obtain from the server a first target group from the plurality of comments, the first target group including reply targets having similar contents, a reply target determination unit configured to determine the reply targets according to the first target group returned by the server, a reply determination unit configured to determine a reply to the reply targets, and a reply sending unit configured to send the reply to the reply targets.

Another aspect of the present disclosure is directed to an apparatus for replying to comments. The apparatus may comprise a reply obtaining unit configured to obtain a reply to reply targets, a first target group including the reply targets, and the first target group being comments sharing a similar content, and a reply providing unit configured to provide the reply.

Another aspect of the present disclosure is directed to a non-transitory computer-readable storage medium storing one or more programs. The one or more programs comprise instructions that, when executed by a processor of a computer system, cause the computer system to perform a method. The method comprises obtaining a request to reply to a plurality of comments on a published post, determining a first target group from the plurality of comments, the first target group including reply targets having similar contents, and sending a reply to each of the reply targets.

Another aspect of the present disclosure is directed to a non-transitory computer-readable storage medium storing one or more programs. The one or more programs comprise instructions that, when executed by a processor of a computer system, cause the computer system to perform a method. The method comprises sending to a server a request to reply to a plurality of comments on a published post, obtaining, from the server, a first target group from the plurality of comments, the first target group including reply targets having similar contents, determining the reply targets according to the first target group returned by the server, determining a reply to the reply targets, and sending the reply to the reply targets.

Another aspect of the present disclosure is directed to a non-transitory computer-readable storage medium storing one or more programs. The one or more programs comprise instructions that, when executed by a processor of a computer system, cause the computer system to perform a method. The method comprises obtaining a reply to reply targets, a first target group including the reply targets, and the first target group being comments sharing a similar content, and providing the reply.

Additional features and advantages of the present disclosure will be set forth in part in the following detailed description, and in part will be obvious from the description, or may be learned by practice of the present disclosure. The features and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements, unless otherwise represented. The implementations set forth in the following description of exemplary embodiments consistent with the present invention do not represent all implementations consistent with the invention. Instead, they are merely examples of systems and methods consistent with aspects related to the invention as recited in the appended claims.

Consistent with exemplary embodiments of this disclosure, in order to provide convenience for replying to comments, contents of the comments are analyzed for similarities and a group of similar comments is determined. The user can reply only once to all comments in the group of similar comments.

[Exemplary Embodiment 1]

Figure 1:
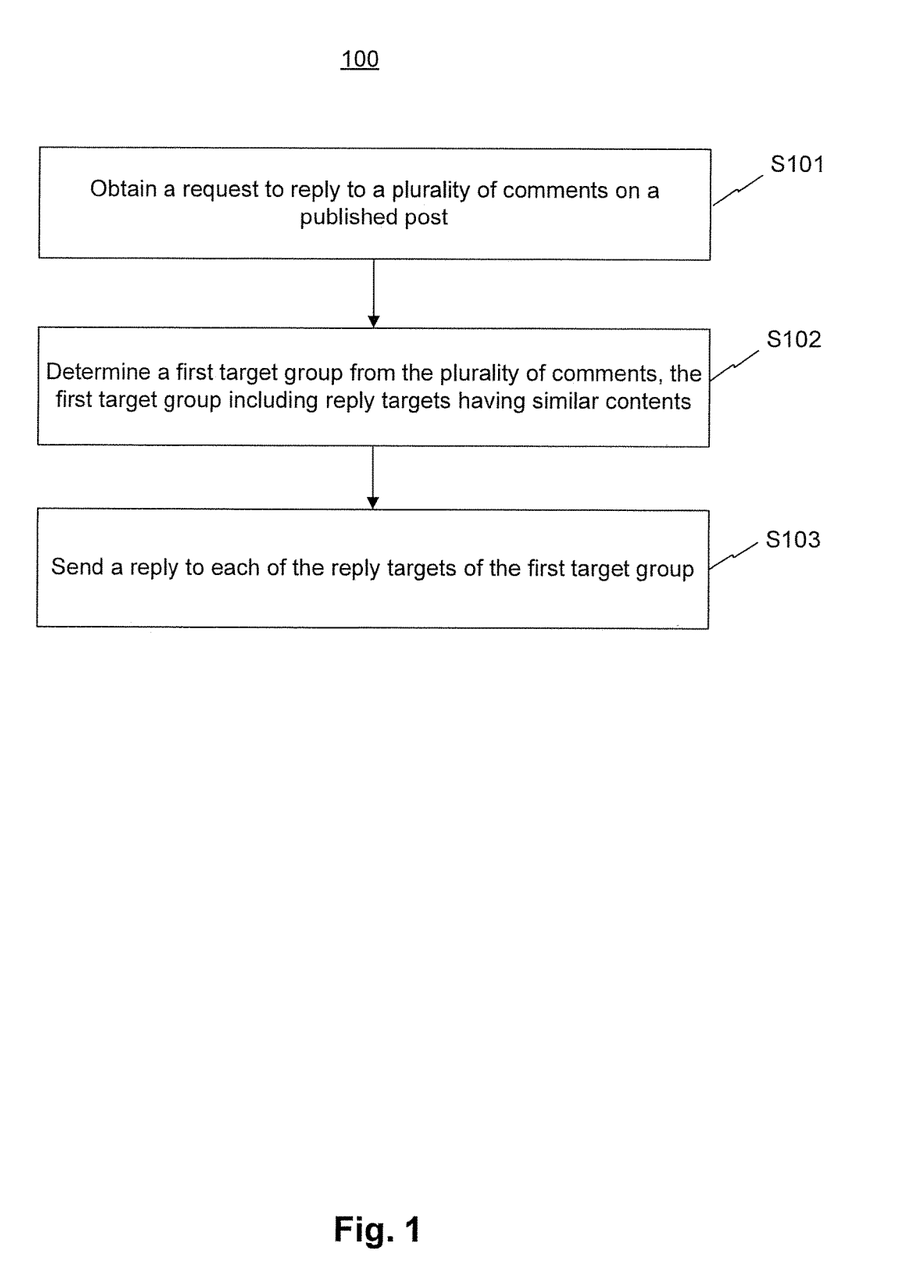
FIG. 1 is a flow diagram illustrating a method for replying to comments, according to an exemplary embodiment.

FIG. 1 is a flow diagram illustrating a method 100 for replying to comments, according to an exemplary embodiment. Method 100 may include a number of steps, some of which may be optional. Method 100 may be performed by a terminal device or a server, the terminal device and the server each comprising a processor and a non-transitory computer-readable storage medium storing instructions. The instructions, when executed by the processor, perform the steps described below. Method 100 may also be performed by a system comprising the terminal device and/or the server.

At step 101, the system obtains a request to reply to a plurality of comments on a published post. The published post can be anything that user A publishes on a social network, e.g., status, photo, and shared links. The plurality of comments on the published post can be made by other users, e.g., B, C, and D. A may be mutual online friends with B, C, and D, e.g., A and B are friends with each other on the social network. The online friendship can also be unilateral. For example, B has subscribed to A, or B is a follower of A. Thus, B can comment on A's posts, but A may not have subscribed to or followed B. The rule of commenting may be set by an individual social network.

Consistent with exemplary embodiments of this disclosure, a user can reply to multiple comments together. In one example, an option of collectively replying to some comments can be provided at an interface displaying the comments, so that a user can select the option if needed. In some embodiments, the user can reply to one of the multiple comments. After the user selects the comment that the user would like to reply to, the option of collectively replying to more comments in addition to the selected comment can be provided at the interface displaying the comments, i.e., when the user selects a target comment, for example, by clicking on the target comment, the option of collectively replying to more comments in addition to the selected comment can be provided. The user can thus select more comments to reply together. In one example illustrated in FIG. 2, if a user clicks on the comment of person E, an input textbox can be provided for the user to enter a reply comment. The textbox may also have a "+" sign or any other sign that can provide the option of collectively replying to more comments in addition to the selected comment. The user can therefore reply to additional comments together with the selected comment by clicking on the "+" sign.

In some exemplary embodiments, the request described above may be obtained by a terminal device from a user. In some other exemplary embodiments, the request may be obtained by a server from a terminal device.

At step 102, the system determines a first target group from the plurality of comments, the first target group including reply targets having similar contents.

Consistent with some exemplary embodiments of this disclosure, after the request described above is obtained, contents of the plurality of comments can be analyzed and similar contents can be determined by the system. Comments of similar contents or having similar meanings can be grouped together, so that they can be replied to together.

There can be many ways of analyzing the contents to determine similar contents. In some embodiments, common keywords can be identified to indicate similar contents. Also, a preset synonym table can be used to analyze the contents and indicate similar contents. In one example, comment A may read "you lost weight" and comment B may read "you just lost weight, LOL." Both comments can be determined to have highly similar contents due to the keywords "lost weight" and can be grouped together. In addition, comment C may read "ur on diet?" Although comment C does not include the keyword "lost weight," "on diet" may be determined to be a synonym of "lost weight," i.e., in the same synonym table, and they can be determined to have similar contents. By step 102, the first target group, including one or more comments having similar contents, can be determined.

In some exemplary embodiments, step 102 may be implemented by a terminal device. In some other exemplary embodiments, step 102 may be implemented by a server, e.g., a terminal device may request the server to perform step 102 and to determine the first target group.

Consistent with exemplary embodiments of this disclosure, after determining the first target group, the terminal device or the server may generate a reply edit interface to display all or partial contents of the reply targets in the first target group. Accordingly, the user can determine if the first target group has been properly determined, i.e., if the user wants to include the displayed comments in the first target group. The interface may also provide a command option for each of the comments, and the comments may be in a selected state. The command option may be provided as a checkbox. The checkbox may allow selection of multiple comments. The checkbox command option may be provided before or after each comment. If the user wants to select a comment, the user may check its corresponding checkbox. After selecting some comments, additional comments may be selected by checking their corresponding checkboxes. In some embodiments, the reply targets of the first target group may be screened or filtered to obtain a second target group. The second target group may include the screened or filtered reply targets. The screening or filtering process may include adding reply targets to the first target group and/or deleting reply targets from the first target group.

Figure 2:
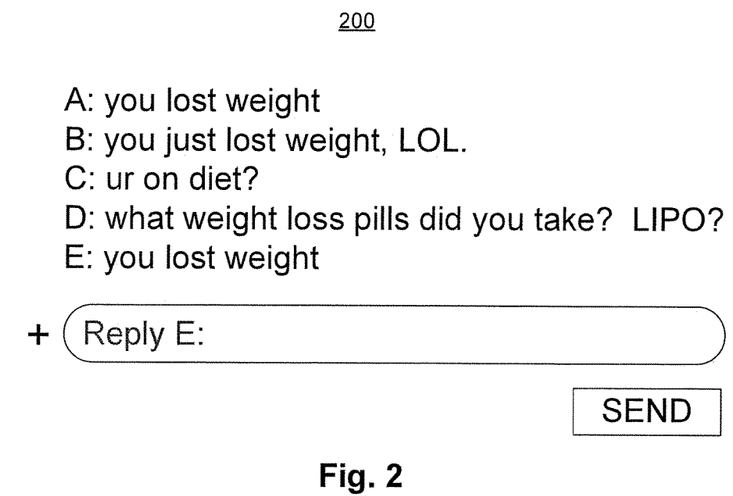
FIGS. 2-3 are graphical representations of replying to comments, according to an exemplary embodiment.
Figure 3:
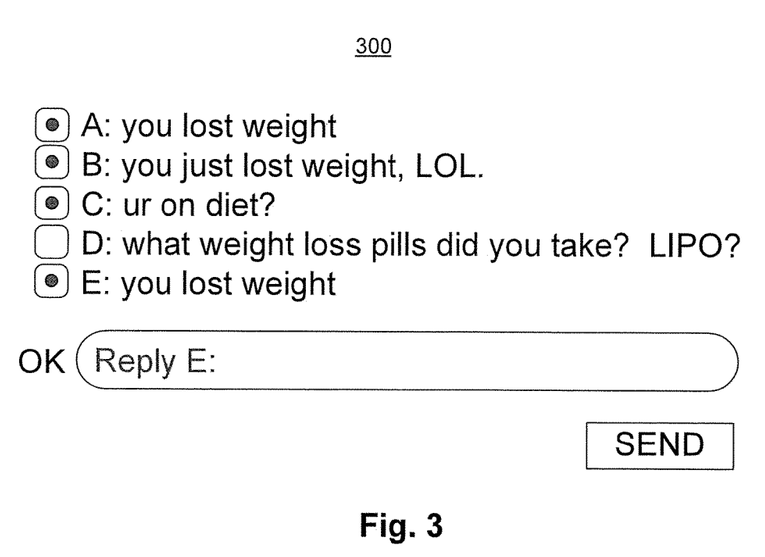

For example, as illustrated in FIG. 2, when a user clicks on comment E, an input textbox can be provided to input a reply message. A sign, e.g., "+", can be provided, and clicking on the sign can trigger a command option. Thus, if the user wants to reply to multiple comments, the user can click on the sign to determine comments of similar contents. After a first target group is obtained, as illustrated in FIG. 3, a reply edit interface can be provided, and checkboxes can be provided in front of each comment, such that the user can select comments to collectively reply to.

Each comment of the first target group determined from step 102 can be in a selected state when its command option is provided. Thus, the user can reply to each comment collectively. In some embodiments, all comments on the reply edit interface, whether selected or unselected, can be manipulated. For example, the user can manually select and/or manipulate a comment. In one embodiment, if a user wants to include some unselected comments in a target group to reply to, the user can select the comments. In some other embodiments, if a user wants to exclude some selected comments from a target group, the user can deselect the comments.

In some embodiments, each comment has a corresponding operation command option through which each comment can be selected. After one or more comments are selected, additional comments can be selected. The selected comment can also be deselected. The selection/deselection can be submitted, for example, by clicking the "OK" button illustrated in FIG. 3. In some embodiments, some comments are already in a selected state, and if the user does not want to select more comments or deselect any comment, clicking the "OK" button will submit the selected comments. A second target group may be determined from the submission. Some comments of the second target group may be from the submission. Some comments of the second target group may also be comments of the first target group. The second and the first target groups may have some different comments. The first target group may be determined by predictions, e.g., machine predictions. The second target group may be determined by the user based on the user's actual needs.

In some embodiments, the reply edit interface may include, in addition to the operation command described above, an input box to input a reply. For example, a user may enter a reply, e.g., texts or photos, in the input box and submit the reply by clicking a "submit" button. Thus, through the reply edit interface, a reply and/or a command option entered by the user can be submitted.

Step 102 may be implemented by a terminal device. Step 102 may also be implemented by a server.

At step 103, the system sends a reply to each of the reply targets of the first target group.

In some embodiments, the first or second target group described above can be the comments that the user wants to collectively reply to. The user can also enter a reply for distribution to the first or second target group. The reply can be regenerated to reply to each comment of the first or second target group. For example, if 10 comments are to be collectively replied to, the reply can be generated 10 times to reply to each of the 10 comments. In one embodiment illustrated in FIG. 3, four comments are selected to be collectively replied to. If a user enters "so happy, hehe," as a reply in the input box, replies to the selected comments can be generated as: "Reply to A: so happy, hehe"; "Reply to B: so happy, hehe"; "Reply to C: so happy, hehe"; and "Reply to E: so happy, hehe." Thus, the user can reply to all four comments at once with a simplified method and a saved operation cost. From a system perspective, Internet transmission resources can be conserved.

In some embodiments, the reply can be generated by a terminal device or by a server. For example, a reply corpus, including suggested replies, can be provided. Each of the suggested replies can be associated with a keyword identified from a comment. Thus, a suggested reply to multiple comments can be generated based on similar keywords shared among the multiple comments. In one embodiment of a reply corpus, the keyword "lost weight" corresponds to a suggested reply of "so happy, hehe." Thus, a suggested reply to comments A, B, and E illustrated in FIG. 3 can be generated as "so happy, hehe."

Step 103 can be implemented by a terminal device or a server. If a suggested reply is generated by a terminal device, the terminal device can transmit the suggested reply and the first/second target group to the server. The server can thus notify authors of comments in the first/second target group about the reply. In some other embodiments, a terminal device of the user sending the reply to comments can transmit the reply to individual terminal devices of authors of the comments.

By determining similar contents among comments and collectively replying to comments having similar contents, user operation steps can be simplified with an increase in efficiency, and Internet resources can be conserved.

In some embodiments of collectively replying to comments, other factors in addition to content similarity can be used to determine the first/second target group. Other factors may include a relationship between authors of the comments and the user receiving the comments, e.g., if they are mutually friended or mutually followed. In one example, two comments have similar contents, but one of them, comment author Jenny, is a good friend of the user receiving the comments, and from their communication history, it can be determined that they frequently communicate with each other. In contrast, the other comment author, Alice, is just a follower of the user who does not have much interaction with Alice. In this example, the user may want to reply to Jenny and Alice differently. Using FIG. 2 as an illustration, if user A is a close friend of the user, the user may want to simply reply to user A with "yeah lol." And if user B is just a follower of the user, the user may want to reply to user B more formally, for example, with "so happy, thank you."

Thus, in addition to determining content similarity, factors such as a relationship between the comment author and the user receiving the comments can be used to determine the first/second target group. The author's and the user's contact lists, friend lists, and follow lists (lists of people they follow) can be used to determine the relationship. In addition, a communication history between them can be used to determine how close they are. Based on the determined relationship and/or the determined level of closeness, one or more sub-target groups can be determined from the first target group, each of the sub-target groups including grouped reply targets having similar contents, and authors of the grouped reply targets of each sub-target group having similar relationships with the user.

In some embodiments, a grouping rule can be established to group the comment authors. For example, the comment authors can be grouped into categories such as close friends and ordinary friends. In one example, a comment author can be categorized as a close friend if the comment author is on a friend list of the user or is followed by the user, and if the level of interaction between them according to their communication history is above a threshold. In another example, a comment author can be categorized as an ordinary friend if the comment author is on a friend list of the user or is followed by the user, and if the level of interaction between them according to their communication history is below a threshold. Thus, comments or reply targets of similar contents can be categorized into sub-target groups according to the relationship between the authors of the comments and the user receiving the comments. In one example, a published post by a user receives 100 comments. Fifty of the 100 comments have similar contents by 50 authors. Authors of 20 out of the 50 comments are in a close friend category of the user. Authors of the other 30 comments are in an ordinary friend category of the user. Thus, two sub-target groups (the 20 authors and the 30 authors) can be determined from the first target group (the 50 authors).

In the reply edit interface, operation command options associated with the sub-target groups can be provided. Thus, the user can select and collectively reply to one sub-target group before returning to the interface and replying to another sub-target group.

In some embodiments, the reply can be modified to avoid being seemingly machine-generated. For example, the same content used multiple times in replies with the same time stamps may look like it has been machine-generated. To avoid such a situation, in some embodiments, after the reply is obtained, the reply can be modified to have multiple versions of similar contents. The multiple versions may have similar meanings, and each of the multiple versions may reply to one of the reply targets. When these close versions are used as replies, the replies can look different from one another. Generating multiple versions of the reply can be based on a preset synonym table/list. For example, if a reply is "of course," and according to a preset synonym table, "of course" has synonyms such as "sure" and "yes," they can be generated as different versions of the reply. Thus, the different versions of the reply can be used to reply to the second target group. In addition, the different versions of replies can be sent at different times, such that the replies can be received with different time stamps. The reply for each of the reply targets may also be generated with different time stamps.

In some embodiments, new comments on a post may be received at different times. The user receiving the comments may need to reply to new comments after replying to some old comments. Similar contents among the new comments and the old comments can be determined. If a new comment has a similar content as an old comment that has been replied to, a reply to the old comment can be used as a reply to the new comment. Thus, new comments may be automatically replied to with less operation cost.

The steps described above can be implemented by a terminal device or by a server, or by a combination of both. More exemplary embodiments are described below.

[Exemplary Embodiment 2]

Exemplary embodiment 2 provides an illustration from a terminal device user's perspective. The terminal device user may refer to the user replying to comments. For example, after user Alice publishes a post, other users comment on the post, and Alice needs to reply to the comment from her terminal device.

Figure 4:
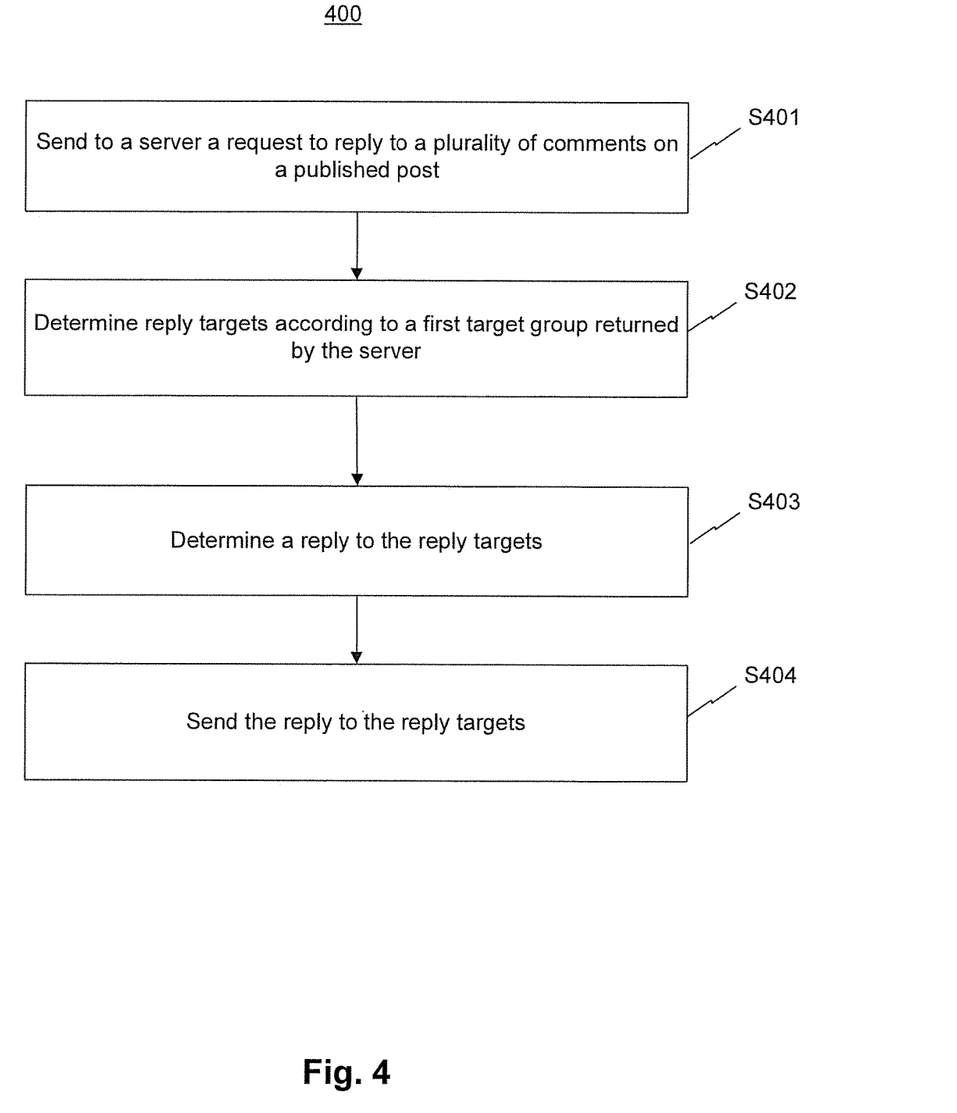
FIG. 4 is a flow diagram illustrating another method for replying to comments, according to an exemplary embodiment.

FIG. 4 is a flow diagram illustrating another method 400 for replying to comments, according to an exemplary embodiment. Method 400 may include the following steps. Method 400 may include a number of steps, some of which may be optional. Method 400 may be performed by a terminal device and/or a server comprising a processor and a non-transitory computer-readable storage medium storing instructions. The instructions, when executed by the processor, perform the steps.

At step 401, a terminal device sends to a server a request to reply to a plurality of comments on a published post, the server determining a first target group from the plurality of comments and returning the first target group to the terminal device, the first target group including reply targets having similar contents.

At step 402, the terminal device determines the reply targets according to the first target group returned by the server.

After obtaining the first target group from the server, the terminal device may further perform grouping/filtering to the reply targets of the first target group.

At step 403, the terminal device determines a reply to the reply targets.

The reply can be based on contents entered by a user of the terminal device. The reply can also be auto-generated by a preset reply corpus.

At step 404, the terminal device sends the reply to the reply targets.

The reply can be sent by a terminal device to terminal device transmission. The reply can also be sent to a server, and the server transmits the reply to terminal devices of the reply targets.

Detailed steps of this embodiment are described above with respect to exemplary embodiment 1 and is not repeated here.

[Exemplary Embodiment 3]

Figure 5:
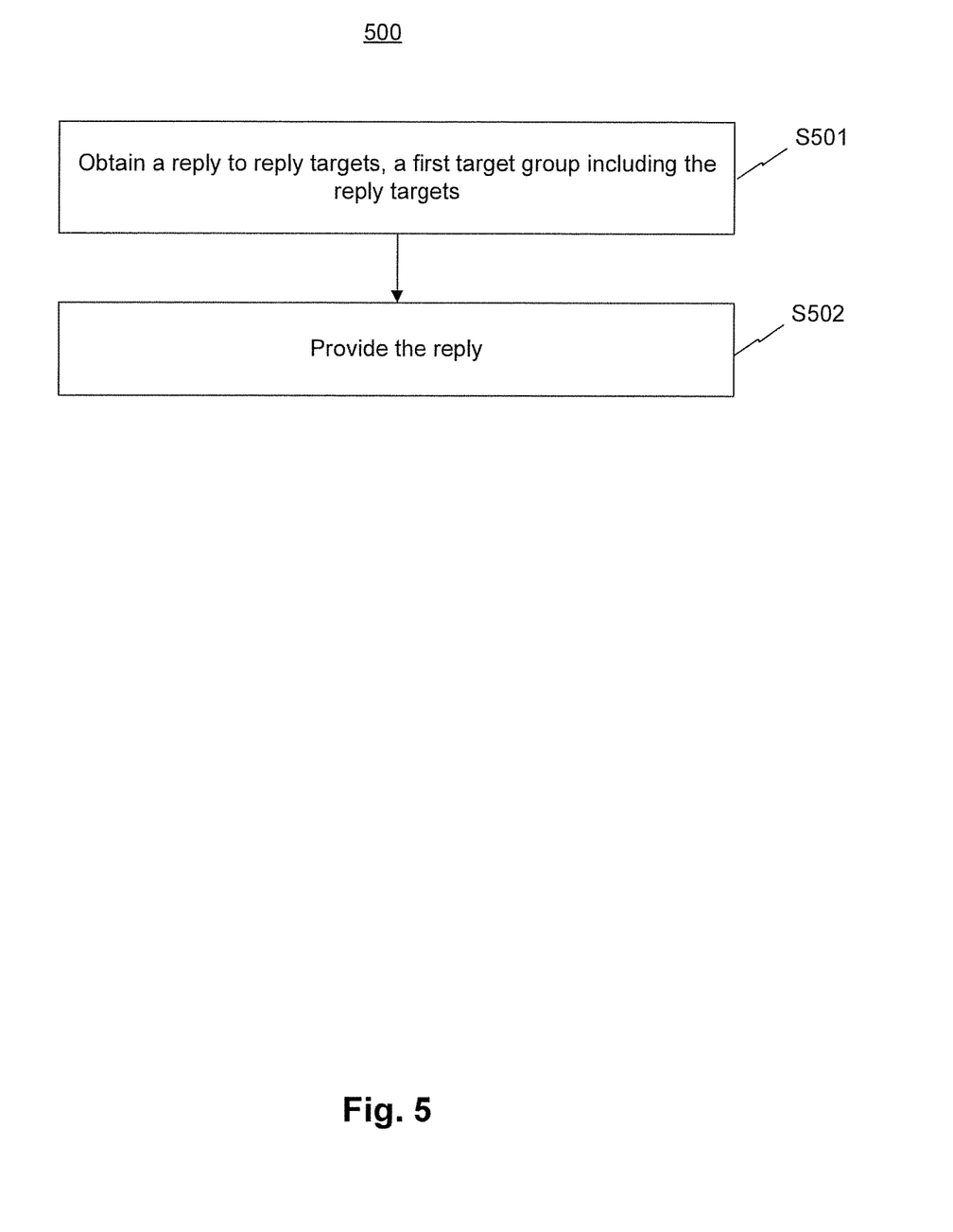
FIG. 5 is a flow diagram illustrating a method for obtaining replies to comments, according to an exemplary embodiment.

Exemplary embodiment 3 provides an illustration from a receiver terminal device user's perspective, i.e., a user who commented on a post and receives replies to the comment. FIG. 5 is a flow diagram illustrating a method 500 for obtaining replies to comments, according to an exemplary embodiment. Method 500 may include a number of steps, some of which may be optional. Method 500 may be performed by a terminal device and/or a server comprising a processor and a non-transitory computer-readable storage medium storing instructions. The instructions, when executed by the processor, perform the steps.

At step 501, a receiver terminal device obtains a reply to reply targets, a first target group including the reply targets, and the first target group being comments sharing a similar content.

At step 502, the receiver terminal device provides a user of the receiver terminal device with the reply, e.g., by displaying the reply.

Figure 6:
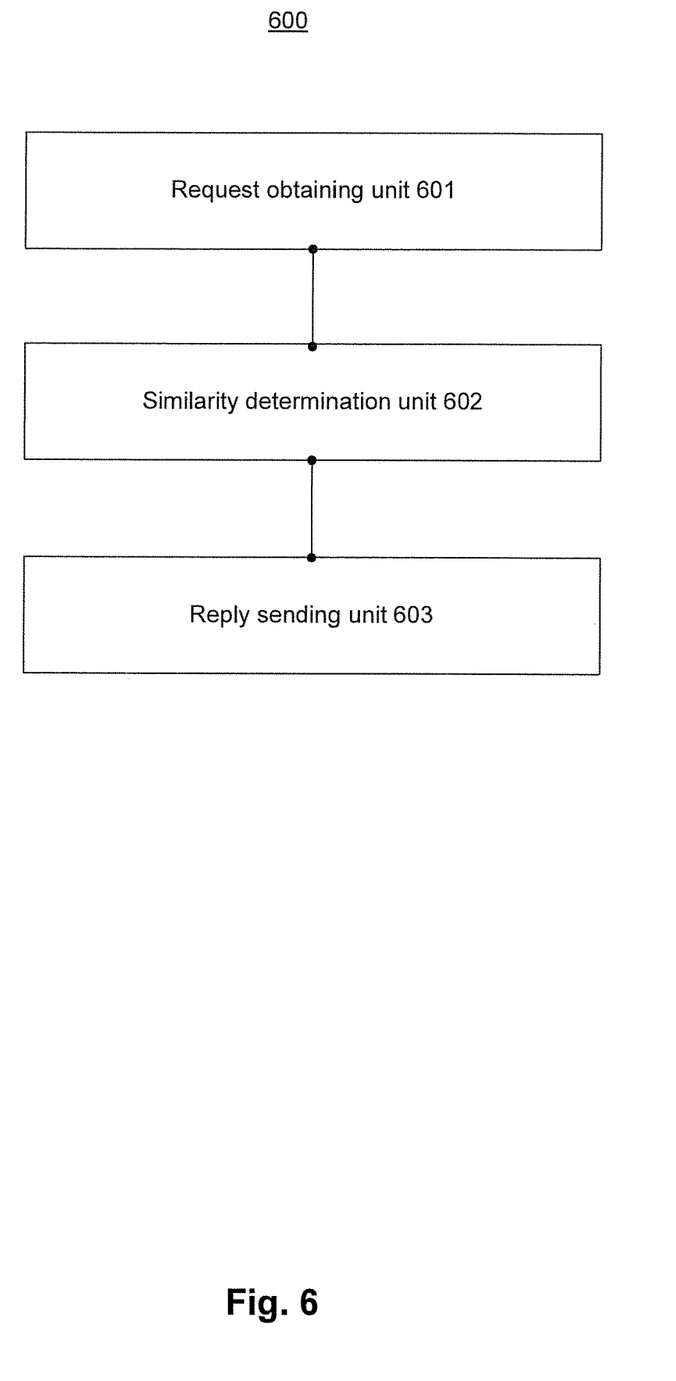
FIG. 6 is a block diagram illustrating an apparatus for replying to comments, according to an exemplary embodiment.

FIG. 6 is a block diagram illustrating an apparatus 600 for replying to comments, according to an exemplary embodiment. Apparatus 600 may include:

a request obtaining unit 601 configured to obtain a request to reply to a plurality of comments on a published post, a similarity determination unit 602 configured to determine a first target group from the plurality of comments, the first target group including reply targets having similar contents, and a reply sending unit 603 configured to send a reply to each of the reply targets.

In some embodiments, apparatus 600 may further include a triggering unit configured to, when one or more of the comments are selected, provide a command option to trigger the request to reply to the one or more of the comments on the published post.

In some embodiments, apparatus 600 may further include a filtering unit configured to filter the reply targets to obtain a second target group, the second target group including filtered reply targets.

Reply sending unit 603 may be further configured to send the reply to each of the filtered reply targets.

In some embodiments, apparatus 600 may further include a display unit configured to display all or partial contents of the reply targets.

Similarity determination unit 602 may include:

a reply target determination sub-unit configured to determine at least one reply target from the comments, the at least one reply target having similar contents, a relationship determination sub-unit configured to determine a relationship between the at least one reply target's author and a user receiving the comments, and a target group determination sub-unit configured to determine the first target group based on the relationship.

The target group determination sub-unit may be further configured to determine a plurality of sub-target groups of the first target group based on different relationships, each of the sub-target groups including grouped reply targets having similar contents, and authors of the grouped reply targets having similar relationships with the user.

In some embodiments, apparatus 600 may further include a sub-group selecting unit configured to provide a command option to filter the sub-target groups to obtain the selected sub-target group.

Reply sending unit 603 may be further configured to send the reply to reply targets in the selected sub-target group.

Apparatus 600 may further include a reply generating unit configured to generate a reply for each of the reply targets.

In some embodiments, the reply generating unit may be further configured to obtain the reply and to generate the reply for each of the reply targets.

In some embodiments, the reply generating unit may be further configured to modify the obtained reply to obtain multiple versions of the reply, the multiple versions having similar meanings, and each of the multiple versions replying to one of the reply targets.

The reply generating unit may be further configured to generate the reply for each of the reply targets with different time stamps.

In some embodiments, apparatus 600 may further include an auto-replying unit configured to:

when new comments on the published post are obtained, determine similar contents between old comments that have been replied to and the new comments, and if a new comment has a similar content as an old comment that has been replied to, use a reply to the old comment as a reply to the new comment.

Figure 7:
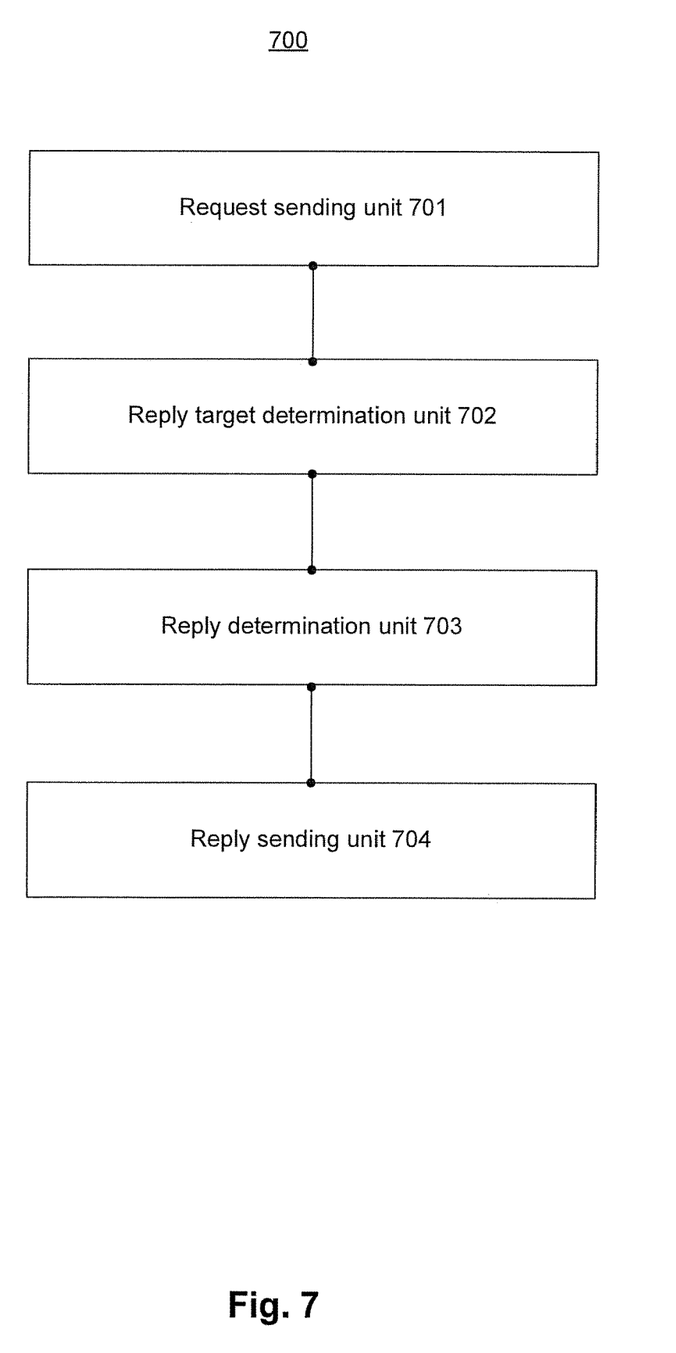
FIG. 7 is a block diagram illustrating another apparatus for replying to comments, according to an exemplary embodiment.

FIG. 7 is a block diagram illustrating another apparatus 700 for replying to comments, according to an exemplary embodiment. Apparatus 700 may include:

a request sending unit 701 configured to send to a server a request to reply to a plurality of comments on a published post and to obtain from the server a first target group from the plurality of comments, the first target group including reply targets having similar contents, a reply target determination unit 702 configured to determine the reply targets according to the first target group returned by the server, a reply determination unit 703 configured to determine a reply to the reply targets, and a reply sending unit 704 configured to send the reply to the reply targets. Reply sending unit 704 may be the same as or different from reply sending unit 603.

In some embodiments, apparatus 700 may further include a filtering unit configured to obtain a request to filter the reply targets and to filter the reply targets to obtain a second target group, the second target group including filtered reply targets.

Reply sending unit 704 may be further configured to send the reply to the filtered reply targets.

Figure 8:
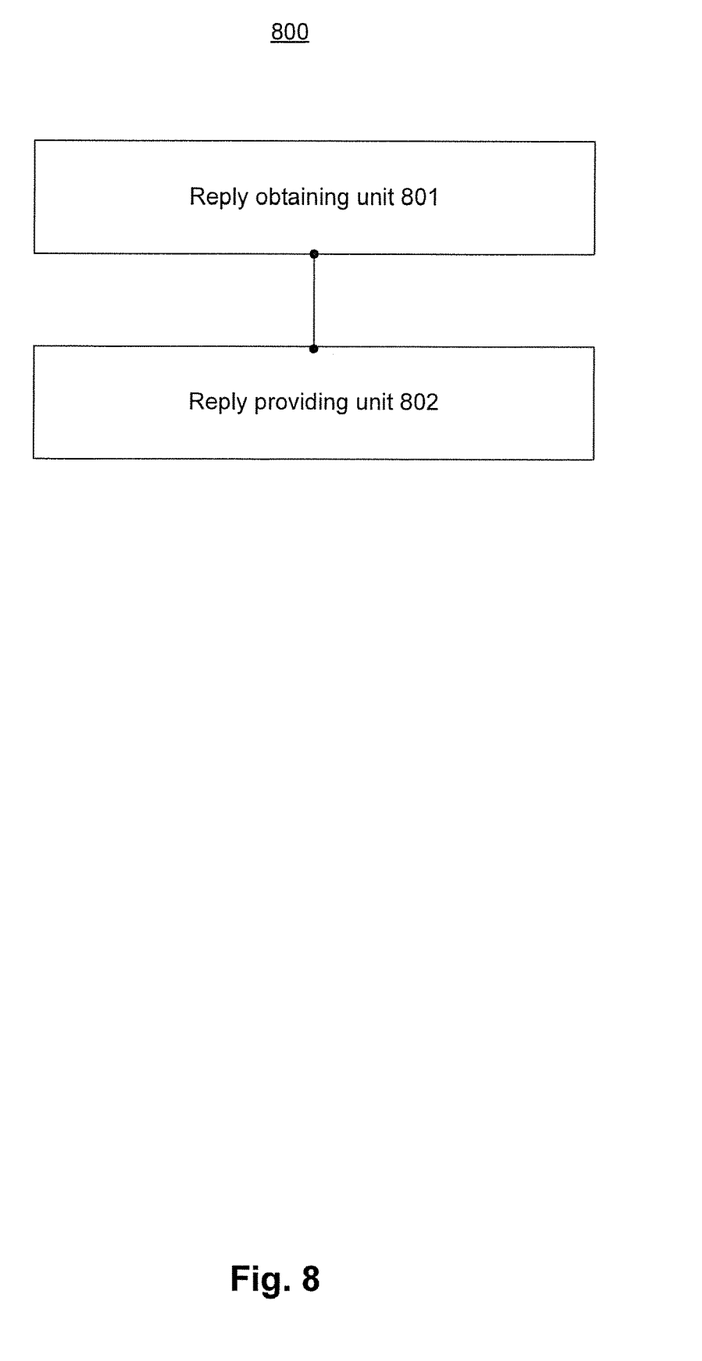
FIG. 8 is a block diagram illustrating another apparatus for obtaining replies to comments, according to an exemplary embodiment.

FIG. 8 is a block diagram illustrating another apparatus 800 for obtaining replies to comments, according to an exemplary embodiment. Apparatus 800 may include:

a reply obtaining unit 801 configured to obtain a reply to reply targets, a first target group including the reply targets, and the first target group being comments sharing a similar content, and a reply providing unit 802 configured to provide the reply, e.g., by displaying the reply.

A person skilled in the art can further understand that various exemplary logic blocks, modules, circuits, and algorithm steps described with reference to the disclosure herein may be implemented as electronic hardware, computer software, or a combination of electronic hardware and computer software. For example, the modules/units may be implemented by a processor executing software instructions stored in the computer-readable storage medium.

The flowcharts and block diagrams in the accompanying drawings show system architectures, functions, and operations of possible implementations of the system and method according to multiple embodiments of the present invention. In this regard, each block in the flowchart or block diagram may represent one module, one program segment, or a part of code, where the module, the program segment, or the part of code includes one or more executable instructions used for implementing specified logic functions. It should also be noted that, in some alternative implementations, functions marked in the blocks may also occur in a sequence different from the sequence marked in the drawing. For example, two consecutive blocks actually can be executed in parallel substantially, and sometimes, they can also be executed in reverse order, which depends on the functions involved. Each block in the block diagram and/or flowchart, and a combination of blocks in the block diagram and/or flowchart, may be implemented by a dedicated hardware-based system for executing corresponding functions or operations, or may be implemented by a combination of dedicated hardware and computer instructions.

As will be understood by those skilled in the art, embodiments of the present disclosure may be embodied as a method, a system, or a computer program product. Accordingly, embodiments of the present disclosure may take the form of an entirely hardware embodiment, an entirely software embodiment or an embodiment combining software and hardware. Furthermore, embodiments of the present disclosure may take the form of a computer program product embodied in one or more computer-readable storage media (including but not limited to a magnetic disk memory, a CD-ROM, an optical memory, and so on) containing computer-readable program codes.

Embodiments of the present disclosure are described with reference to flow diagrams and/or block diagrams of methods, devices (systems), and computer program products according to embodiments of the present disclosure. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general-purpose computer, a special-purpose computer, an embedded processor, or other programmable data processing devices to produce a machine, such that the instructions, which are executed via the processor of the computer or other programmable data processing devices, create a means for implementing the functions specified in one or more flows in the flow diagrams and/or one or more blocks in the block diagrams.

These computer program instructions may also be stored in a computer-readable memory that can direct a computer or other programmable data processing devices to function in a particular manner, such that the instructions stored in the computer-readable memory produce a manufactured product including an instruction means that implements the functions specified in one or more flows in the flow diagrams and/or one or more blocks in the block diagrams.

These computer program instructions may also be loaded onto a computer or other programmable data processing devices to cause a series of operational steps to be performed on the computer or other programmable devices to produce processing implemented by the computer, such that the instructions which are executed on the computer or other programmable devices provide steps for implementing the functions specified in one or more flows in the flow diagrams and/or one or more blocks in the block diagrams. In a typical configuration, a computer device includes one or more Central Processing Units (CPUs), an input/output interface, a network interface, and a memory. The memory may include forms of a volatile memory, a random access memory (RAM), and/or non-volatile memory and the like, such as a read-only memory (ROM) or a flash RAM in a computer-readable storage medium. The memory is an example of a computer-readable storage medium.

The computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The computer-readable storage medium includes non-volatile and volatile media, and removable and non-removable media, wherein information storage can be implemented with any method or technology. Information may be modules of computer-readable instructions, data structures and programs, or other data. Examples of a computer-readable storage medium include but are not limited to a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage or other magnetic storage devices, or any other non-transmission media that may be used to store information capable of being accessed by a computer device. The computer-readable storage medium is non-transitory, and does not include, transitory media, such as modulated data signals and carrier waves.

The specification has described methods, apparatus, and systems for replying to comments. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with the disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A method for replying to comments, comprising:
    displaying, by a terminal device, a plurality of comments on a published post;
    receiving, by the terminal device, a selection of a first comment from the plurality of comments by a user;
    in response to the receiving, providing an interface for the user to collectively reply to one or more comments from the plurality of comments in addition to the first comment;
    obtaining, by the terminal device via the interface, a request to reply to a second comment from the plurality of comments in addition to the first comment;
    determining, by the terminal device, a first target group from the plurality of comments, the first target group comprising reply targets having at least one keyword that is common or synonymous with a keyword in the first comment;
    displaying, by the terminal device, the reply targets in the first target group; and
    sending, by the terminal device, a reply to one or more of the reply targets in the first target group.

2. The method of claim 1, further comprising:
providing, by the terminal device, a command option to trigger the request to reply to the first comment and the second comment.

3. The method of claim 1, further comprising:
receiving, by the terminal device, the reply to send to one or more of the reply targets in the first target group, the reply being input by the user; or
generating, by the terminal device, the reply to send to one or more of the reply targets in the first target group.

4. The method of claim 3, wherein generating, by the terminal device, the reply to send to one or more of the reply targets in the first target group comprises:
obtaining the reply; and
modifying the obtained reply to obtain multiple versions of the reply, and each of the multiple versions to send to one of the reply targets.

5. The method of claim 3, wherein generating, by the terminal device, the reply to send to one or more of the reply targets in the first target group comprises:
generating the reply for one or more of the reply targets with different time stamps.

6. The method of claim 1, further comprising
filtering, by the terminal device, the reply targets to obtain a second target group, the second target group comprising filtered reply targets;
wherein sending, by the terminal device, the reply to one or more of the reply targets in the first target group comprises sending, by the terminal device, the reply to the filtered reply targets.

7. The method of claim 1, wherein determining, by the terminal device, the first target group comprises displaying, by the terminal device, all or partial contents of the reply targets.

8. The method of claim 1, wherein determining, by the terminal device, the first target group from the plurality of comments comprises:
determining at least one reply target from the plurality of comments, the at least one reply target having at least one keyword that is common or synonymous with a keyword in the first comment;
determining a relationship between the at least one reply target's author and the user; and
determining the first target group based on the relationship.

9. The method of claim 8, wherein:
determining the first target group based on the relationship comprises determining a plurality of sub-target groups of the first target group based on different relationships between authors of the reply targets and the user;
the method further comprises providing a command option to filter the sub-target groups to obtain a selected sub-target group; and
sending the reply to one or more of the reply targets in the first target group comprises sending the reply to reply targets in the selected sub-target group.

10. The method of claim 1, further comprising:
when new comments on the published post are obtained, determining, by the terminal device, similar contents between old comments that have been replied to and the new comments; and
in response to determining that a new comment has a similar content as an old comment that has been replied to, using, by the terminal device, a reply to the old comment as a reply to the new comment.

11. A non-transitory computer-readable storage medium that stores a set of instructions that, when executed by at least one processor of a terminal device, causes the terminal device to perform a method for replying to comments, the method comprising:
displaying, by a terminal device, a plurality of comments on a published post;
receiving, by the terminal device, a selection of a first comment from the plurality of comments by a user;
in response to the receiving, providing an interface for the user to collectively reply to one or more comments from the plurality of comments in addition to the first comment;
obtaining, by the terminal device via the interface, a request to reply to a second comment from the plurality of comments in addition to the first comment;
determining, by the terminal device, a first target group from the plurality of comments, the first target group comprising reply targets having at least one keyword that is common or synonymous with a keyword in the first comment;
displaying, by the terminal device, the reply targets in the first target group; and
sending, by the terminal device, a reply to one or more of the reply targets in the first target group.

12. The non-transitory computer-readable storage medium of claim 11, wherein the method further comprises:
providing, by the terminal device, a command option to trigger the request to reply to the first comment and the second comment.

13. The non-transitory computer-readable storage medium of claim 11, wherein the method further comprises:
receiving, by the terminal device, the reply to send to one or more of the reply targets in the first target group, the reply being input by the user; or
generating, by the terminal device, the reply to send to one or more of the reply targets in the first target group.

14. The non-transitory computer-readable storage medium of claim 13, wherein generating, by the terminal device, the reply to send to one or more of the reply targets in the first target group comprises:
obtaining the reply; and
modifying the obtained reply to obtain multiple versions of the reply, and each of the multiple versions to send to one of the reply targets.

15. The non-transitory computer-readable storage medium of claim 13, wherein generating, by the terminal device, the reply to send to one or more of the reply targets in the first target group comprises:
generating the reply for one or more of the reply targets with different time stamps.

16. The non-transitory computer-readable storage medium of claim 11, wherein:
the method further comprises filtering, by the terminal device, the reply targets to obtain a second target group, the second target group comprising filtered reply targets; and
sending, by the terminal device, the reply to one or more of the reply targets in the first target group comprises sending, by the terminal device, the reply to the filtered reply targets.

17. The non-transitory computer-readable storage medium of claim 11, wherein determining, by the terminal device, the first target group comprises displaying, by the terminal device, all or partial contents of the reply targets.

18. The non-transitory computer-readable storage medium of claim 11, wherein determining, by the terminal device, the first target group from the plurality of comments comprises:
  determining at least one reply target from the plurality of comments, the at least one reply target having at least one keyword that is common or synonymous with a keyword in the first comment;
  determining a relationship between the at least one reply target's author and the user; and
  determining the first target group based on the relationship.

19. The non-transitory computer-readable storage medium of claim 18, wherein:
  determining the first target group based on the relationship comprises determining a plurality of sub-target groups of the first target group based on different relationships between authors of the reply targets and the user;
  the method further comprises providing a command option to filter the sub-target groups to obtain a selected sub-target group; and
  sending the reply to one or more of the reply targets in the first target group comprises sending the reply to reply targets in the selected sub-target group.

20. A terminal device, comprising:
  a memory storing a set of instructions; and
  a processor configured to execute the set of instructions to cause the terminal device to perform a method for replying to comments, the method comprising:
  displaying, by a terminal device, a plurality of comments on a published post;
  receiving, by the terminal device, a selection of a first comment from the plurality of comments by a user;
  in response to the receiving, providing an interface for the user to collectively reply to one or more comments from the plurality of comments in addition to the first comment;
  obtaining, by the terminal device via the interface, a request to reply to a second comment from the plurality of comments in addition to the first comment;
  determining, by the terminal device, a first target group from the plurality of comments, the first target group comprising reply targets having at least one keyword that is common or synonymous with a keyword in the first comment;
  displaying, by the terminal device, the reply targets in the first target group; and
  sending, by the terminal device, a reply to one or more of the reply targets in the first target group.

* * * * *